(12) United States Patent
Aalderink et al.

(10) Patent No.: US 8,469,379 B2
(45) Date of Patent: Jun. 25, 2013

(54) SUPPORT FOR PNEUMATIC SPRING OF WHEEL AXLE SUSPENSION

(75) Inventors: Derk Geert Aalderink, Laren (NL); Geert Everts, Dalfsen (NL); Matthijs van Dop, Elburg (NL)

(73) Assignee: VDL Weweler B.V., AP Apeldoorn (NL)

( * ) Notice: Subject to any disclaimer, the term of this patent is extended or adjusted under 35 U.S.C. 154(b) by 0 days.

(21) Appl. No.: 13/201,514

(22) PCT Filed: Feb. 17, 2009

(86) PCT No.: PCT/NL2009/000035
§ 371 (c)(1),
(2), (4) Date: Aug. 30, 2011

(87) PCT Pub. No.: WO2010/095924
PCT Pub. Date: Aug. 26, 2010

(65) Prior Publication Data
US 2011/0304115 A1    Dec. 15, 2011

(51) Int. Cl.
*B60G 9/00* (2006.01)
(52) U.S. Cl.
USPC ............................ 280/124.116; 280/124.157
(58) Field of Classification Search
USPC ............ 280/124.116, 124.11, 124.157, 86.75
See application file for complete search history.

(56) References Cited

U.S. PATENT DOCUMENTS

| 3,434,707 | A | * | 3/1969 | Raidel | 267/31 |
| 2003/0164585 | A1 | | 9/2003 | Memmel et al. | |
| 2005/0156398 | A1 | | 7/2005 | Ramsey | |
| 2005/0242541 | A1 | | 11/2005 | Griffiths | |
| 2009/0212523 | A1 | | 8/2009 | Koschinat | |

FOREIGN PATENT DOCUMENTS

| DE | 298 24 897 U1 | 5/2003 |
| DE | 10 2005 038 274 A1 | 2/2007 |
| EP | 1 211 107 A2 | 6/2002 |
| WO | 2009/014423 A1 | 1/2009 |

OTHER PUBLICATIONS

International Search Report: mailed 07/10/2009; PCT/NL2009/000035.

* cited by examiner

*Primary Examiner* — Eric Culbreth
(74) *Attorney, Agent, or Firm* — Ladas & Parry LLP

(57) ABSTRACT

A wheel axle suspension for suspending an axle body of a wheel axle from a vehicle, comprises on both sides of the vehicle a trailing arm which extends in the longitudinal direction of the vehicle. The axle body is attached to the trailing arms. The trailing arms are each hingedly connected at the front in the direction of travel of the vehicle to a bearing bracket which is arranged on the vehicle chassis. The wheel axle suspension furthermore comprises a pneumatic spring which is operational between the trailing arm and the chassis. A pneumatic spring support arm is provided, which is coupled to the axle body for supporting an underside of the pneumatic spring. The pneumatic spring support arm is coupled to the axle body so that the pneumatic spring support arm is mountable in a plurality of orientations with respect to the longitudinal direction of the vehicle.

26 Claims, 1 Drawing Sheet

SUPPORT FOR PNEUMATIC SPRING OF WHEEL AXLE SUSPENSION

The present invention relates to a wheel axle suspension for suspending an axle body of a wheel axle from a vehicle, comprising on both sides of the vehicle a trailing arm which extends in the longitudinal direction of the vehicle and to which the axle body is attached. The trailing arm is hingedly connected at the front in the direction of travel of the vehicle to a bearing bracket, which is arranged on the vehicle chassis. The wheel axle suspension furthermore comprises on both sides of the vehicle a pneumatic spring, which is operational between the trailing arm and the chassis, and a pneumatic spring support arm, which is coupled to the axle body for supporting an underside of the pneumatic spring.

Figure 1:
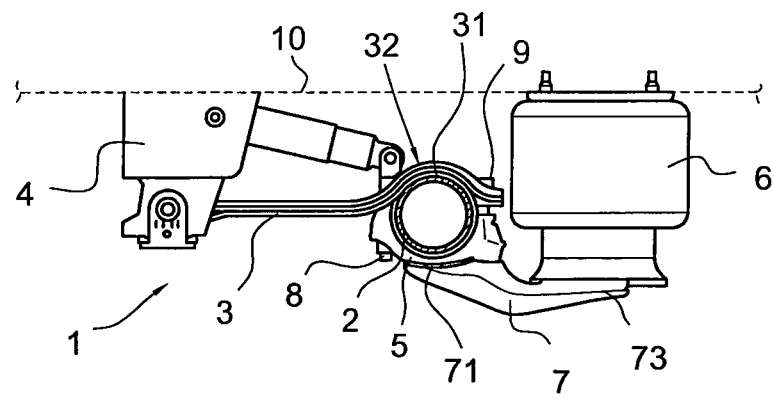

From the prior art it is known that a pneumatic spring support arm is constituted by an integral part of the trailing arm itself as can be seen for example in FIG. 1 of WO 2009/014423 A1. Also a pneumatic spring support arm as an integral part of a clamping part for the axle body is known from FIG. 5 of WO 2009/014423 A1.

In particular in view of the space available next to the tyres of the vehicle, there are situations wherein the pneumatic spring needs to be mounted offset with respect to the longitudial centre axis of the trailing arm.

Several solutions are known from the prior art to mount the pneumatic spring in an offset manner. For example a support plate can be mounted to the rear end portion of the support arm for the pneumatic spring, which support plate extends sideways with respect to the longitudinal direction of the trailing arm. A drawback of the solution with the support plate is that besides a bending force is exerted on the pneumatic spring support arm by the pneumatic spring also a torsional load on the support arm is induced.

Another known solution for mounting the pneumatic spring in an offset manner is that the rear end portion of the trailing arm is bent sideways such that it can support the pneumatic spring. This solution incurs additional work on the trailing arm and thus additional manufacturing costs.

The present invention has for an object to provide an improved wheel axle suspension which allows for offset mounting of a pneumatic spring.

This object is achieved by a wheel axle suspension for suspending an axle body of a wheel axle from a vehicle, comprising on both sides of the vehicle a trailing arm, which extends in the longitudinal direction of the vehicle, and to which the axle body is attached, said trailing arm being hingedly connected at the front in the direction of travel of the vehicle to a bearing bracket, which is arranged on the vehicle chassis, the wheel axle suspension furthermore comprising a pneumatic spring, which is operational between the trailing arm and the chassis and a pneumatic spring support arm, which is coupled to the axle body for supporting an underside of the pneumatic spring, wherein the pneumatic spring support arm is coupled to the axle body in such a way that the pneumatic spring support arm is mountable in a plurality of orientations with respect to the longitudinal direction of the vehicle.

This structure according to the invention allows to adjust the position of the support arm for the pneumatic spring to the specific mounting situation under the vehicle chassis. Thus a structure is provided which is universal, which means that one support arm structure can be used in many different configurations with different offset distances for the pneumatic springs. This reduces manufacturing costs per product as the pneumatic spring support arm may be produced in larger numbers.

In a preferred embodiment the pneumatic spring support arm has a pre-mounted state in which it is rotatable around a swiveling axis to adjust its orientation and has a mounted state in which it is secured such that it is fixed in the selected orientation.

The swiveling axis may be defined by a pin member which extends through an aperture provided on or in the pneumatic spring support arm, wherein preferably said aperture is situated between the end portions of the pneumatic spring support arm.

The pin member may be a threaded rod and a threaded nut is provided to cooperate with the threaded rod so as to clamp the pneumatic spring support arm against a countersurface and fix its orientation.

It is possible to provide a clamping part on that side of the axle body opposite from the side where the trailing arm is attached to the axle body, wherein clamping means are provided which clamp the axle body between the clamping part and the trailing arm, and wherein the pneumatic spring support arm is secured to the clamping part. Preferably the clamping part is provided with the countersurface against which the support arm for the pneumatic spring is clamped.

The clamping part may be provided with one or more recesses and the end portion of the pneumatic spring support arm opposite the end portion where the pneumatic spring is attached, is provided with at least one protrusion that is receivable within the one or more recesses. In a preferred embodiment of the clamping part the recess in the clamping part is a guiding groove, the protrusion on the support arm is received within the guiding groove, and wherein the guiding groove preferably has end stops determining the extreme orientations in which the pneumatic spring support arm is mountable. In another preferred embodiment a plurality of recesses are provided in the clamping part, each recess defining a discrete orientation in which the support arm may be set by receiving the protrusion on the support arm.

Preferably the pneumatic spring is attached to the pneumatic spring support arm such that the centre axis of the pneumatic spring and the centre axis of the support arm intersect each other or nearly intersect each other. This has the advantage that the support arm is not subjected to torsion, but mainly to bending.

The invention furthermore relates to a method for mounting a wheel axle suspension under a vehicle.

Figure 2:
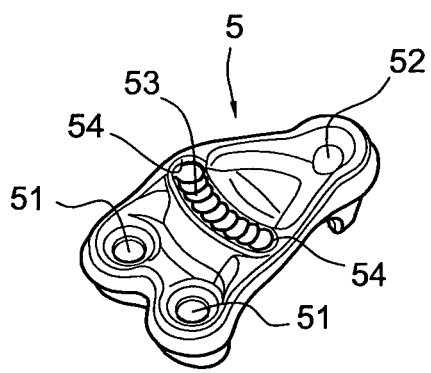
Figure 3:
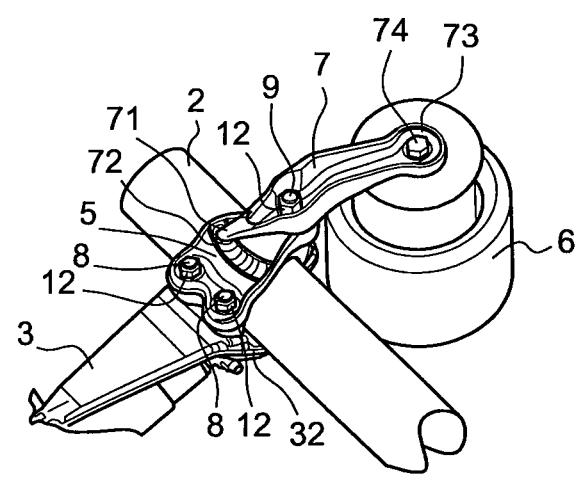
Figure 5:
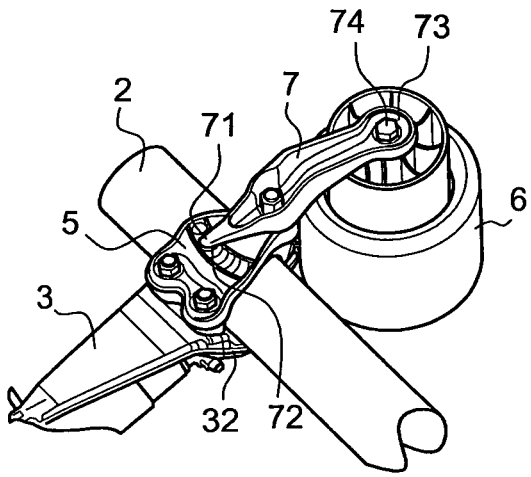
Figure 4:
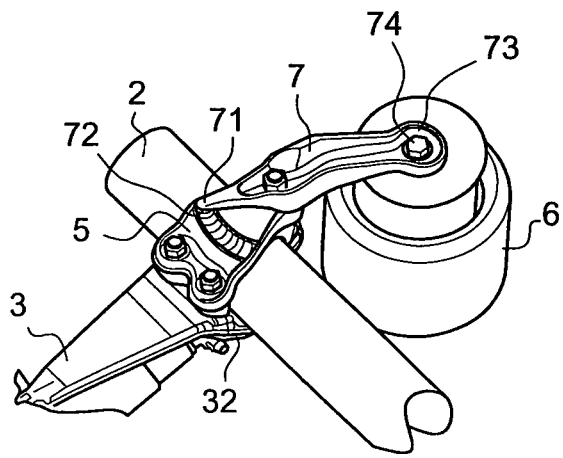

The invention will be described in further detail in the following description with reference to the drawing, in which:

FIG. 1 shows a side elevational view of an embodiment of a wheel axle suspension according to the invention, FIG. 2 shows a clamping part of the wheel axle suspension shown in FIG. 1, FIG. 3 shows a view in perspective from below of a part of the wheel axle suspension of FIG. 1 with a pneumatic spring suspension arm in a first orientation, FIG. 4 shows a view in perspective from below of a part of the wheel axle suspension of FIG. 1 with a pneumatic spring suspension arm in a second orientation, and FIG. 5 shows a view in perspective from below of a part of a wheel axle suspension according to the invention with a different pneumatic spring and with a pneumatic spring suspension arm in a third orientation.

FIGS. 1 and 3-5 show a wheel axle suspension 1 for suspending a wheel axle 2 from a vehicle chassis 10. The suspension 1 comprises a trailing arm 3 on both sides of the vehicle. Each trailing arm 3 extends in the longitudinal direction of the vehicle and is at a front end hingedly attached to a bearing bracket 4 which is attached to the chassis 10. The trailing arm 3 as shown in the figures is a flexible trailing arm, also referred to in the art as a spring arm. It is noted however that the present invention is not limited to suspensions with flexible trailing arms and may just as well be performed with rigid trailing arms.

In the shown embodiment the axle body 2 is clamped against a contact region 31 of the trailing arm 3. On the side of the axle 2 opposite of the contact region 31 a clamping part 5 engages the axle body 1. A pneumatic spring 6 is attached to the vehicle chassis 10 on the upper side and to a support arm 7 on the lower side.

The portion 32 of the trailing arm 2 which forms the contact region 31, in top view, has an approximately triangular shape, the greatest width of which is situated at the front of said portion 32 and the tip of the triangle being situated at the rear of that portion 32. Two holes are provided near the wide front of that portion 32 of the trailing arm which forms the contact region 31, and a single hole is provided at the narrower rear of said portion 32.

The clamping part 5 in the shown embodiment is preferably a cast or forged metal part. The clamping part 5 has in the specific embodiment shown a substantially triangular shape as is best seen in FIG. 2. The clamping part 5 has two holes 51 in the front angles and one hole 52 in the rear angle of the triangular shape. The clamping part 5 in the shown embodiment is symmetrical design with regard to the longitudinal direction of the vehicle.

The axle body 2 is clamped between the contact region 31 and the clamping part 5 by means of three clamping bolts 8, 9, which extend through the bores in the portion 32 of the trailing arm 3 and the holes 51 and 52 in the clamping part, and which bolts 8, 9 cooperate with nuts 11 and 12.

The pneumatic spring support arm 7 is a separate part, preferably a cast or forged metal part. It has a generally elongate shape. The pneumatic spring support arm 7 is attached to the clamping part 5 by means of the clamping bolt 9 which extends through the rear hole 52 in the clamping part 5 and the rear hole in the portion 32 of the trailing arm 3. Thereto the support arm 7 for the pneumatic spring 6 has an aperture which is aligned with the rear hole in the portion 32 of the trailing arm 3 and the rear hole 52 in the clamping part 5 respectively. Thus the clamping bolt 9 can act as a swiveling axis for the support arm 7 when the nut 12 on the bolt 9 is not tightened yet and the support arm 7 is in a pre-mounting state.

At a front end portion 71 of the support arm 7, a protrusion 72 is provided which extends in the direction of the mounted axle body 2. The clamping part 5 has at its side facing away from the axle body 2 a curved groove 53. The protrusion 72 is received in the groove 53 and functions as a guiding groove when the support arm 7 is in the pre-mounting state.

The clamping part 5 in the shown embodiment is symmetrical design with regard to the longitudinal direction of the vehicle. Also the support arm 7 is in the shown embodiment of a symmetrical design. This has the advantage that the same clamping part 5 and support arm 7 can be used on either side of the vehicle with the support arm 7 in any desired position, which makes it a universal applicable and thereby cost effective design.

A rear end portion 73 of the support arm 7, which is opposite the front end portion 71, is provided with a central aperture through which a bolt 74 extends to fix the pneumatic spring 6 to the support arm 7. The pneumatic spring 6 is attached to the pneumatic spring support arm 7 such that the centre axis of the pneumatic spring 6 and the centre axis of the support arm 7 intersect each other or nearly intersect each other.

In the pre-mounting state the bolt 9 and nut 12 are not fully tensioned such that the support arm 7 for the pneumatic spring 6 can swivel around the bolt 9. The position of the support arm 7 can be adjusted in an angular range which is determined by the end faces 54 of the guiding groove 53 which act as end stops for the protrusion 72 on the front end portion 71 of the support arm 7. When the position of the support arm 7 is set such that the desired offset for the rear end portion 73 of the support arm 7 and thus for the pneumatic spring 6 is achieved, the bolt 9 and 12 can be fully tensioned and the support arm 7 is clamped against a surface of the clamping part 5. The support arm 7 now has become its mounted state. The support arm 7 may be mounted in line with the trailing arm 3, thus without offset, but also may be mounted in orientations such that the centre axis of the support arm 7 makes an angle with the centre line of the trailing arm 3 and the pneumatic spring 6 is mounted offset with respect to the centre axis of the trailing arm 3.

It should be appreciated that the specific embodiment as shown in the appending figures must not be considered as limiting. Other or modified embodiments are conceivable for the skilled person which fall well within the scope of the invention. For example it is possible to think of an embodiment where a pin member is welded or otherwise attached to a clamping part, wherein the support arm has an aperture through which the pin member extends. It is also conceivable to fix the support arm 7 in another way than with the single bolt/nut combination 9, 12 as is shown in the figures. It is for example also possible to attach the pneumatic spring support arm to the trailing arm instead of to the clamping part. Also the triangular shape of the contact zone and the clamping part is not essential and the axle may be clamped with straps or more than three bolts. Also embodiments where the axle body is not clamped against the trailing arm but is attached otherwise, e.g. by welding are possible within the scope of the present invention.

The structure according to the invention has for an advantage that the support arm 7 for the pneumatic spring 6 is subjected to bending forces only. Torsional loads, which can occur in constructions known from the prior art, wherein the centre axis of the pneumatic spring and of the support arm do not intersect but cross each other, are avoided in the construction according to the invention, while at the same time the pneumatic spring 6 can be set in any desired offset position. In FIGS. 3-5 three different offset positions of the rear end portion 73 of the support arm 7 are illustrated.

The invention claimed is:

1. Wheel axle suspension for suspending an axle body of a wheel axle from a vehicle, comprising on both sides of the vehicle a trailing arm which extends in the longitudinal direction of the vehicle and to which the axle body is attached, said trailing arm being hingedly connected at the front in the direction of travel of the vehicle to a bearing bracket which is arranged on a vehicle chassis, the wheel axle suspension furthermore comprising a pneumatic spring which is operational between the trailing arm and the chassis and a pneumatic spring support arm which is coupled to the axle body for supporting an underside of the pneumatic spring, wherein the pneumatic spring support arm is coupled to the axle body in such a way that the pneumatic spring support arm is mountable in a plurality of orientations with respect to the longitudinal direction of the vehicle, wherein the pneumatic spring support arm in a pre-mounted state is rotatable around a swiveling axis to adjust its orientation and wherein the pneumatic spring support arm in a mounted state is secured such that it is fixed in the selected orientation, wherein the swiveling axis is defined by a pin member which extends through an aperture provided on or in the pneumatic spring support arm.

2. Wheel axle suspension according to claim 1, wherein said aperture is situated between the end portions of the pneumatic spring support arm.

3. Wheel axle suspension according to claim 2, wherein the pin member is a threaded rod and wherein a threaded nut is provided to cooperate with the threaded rod so as to clamp the pneumatic spring support arm against a countersurface and fix its orientation.

4. Wheel axle suspension according to claim 1, wherein the pin member is a threaded rod and wherein a threaded nut is provided to cooperate with the threaded rod so as to clamp the pneumatic spring support arm against a countersurface and fix its orientation.

5. Wheel axle suspension according to claim 4, wherein the countersurface is provided on a clamping part.

6. Wheel axle suspension according to claim 5, wherein the clamping part is provided with a recess and wherein the end portion of the pneumatic spring support arm opposite the end portion where the pneumatic spring is attached, is provided with at least one protrusion that is receivable within said recess.

7. The method for mounting the wheel axle suspension according to claim 6, wherein the recess in the clamping part is a guiding groove, the protrusion on the support arm is received within the guiding groove, and wherein the guiding groove has end stops determining the extreme orientations in which the pneumatic spring support arm is mountable.

8. The method for mounting the wheel axle suspension according to claim 6, wherein a plurality of recesses are provided in the clamping part, each recess defining a discrete orientation in which the support arm may be set by receiving the protrusion on the support arm.

9. Wheel axle suspension according to claim 1, wherein a clamping part is provided on that side of the axle body opposite from the side where the trailing arm is attached to the axle body, wherein tensioning means are provided which clamp the axle body between the clamping part and the trailing arm, and wherein the pneumatic spring support arm is secured to the clamping part.

10. Wheel axle suspension according to claim 9, wherein the clamping part is provided with a recess and wherein the end portion of the pneumatic spring support arm opposite the end portion where the pneumatic spring is attached, is provided with at least one protrusion that is receivable within said recess.

11. Wheel axle suspension according to claim 10, wherein the recess in the clamping part is a guiding groove, the protrusion on the support arm is received within the guiding groove, and wherein the guiding groove has end stops determining the extreme orientations in which the pneumatic spring support arm is mountable.

12. Wheel axle suspension according to claim 10, wherein a plurality of recesses are provided in the clamping part, each recess defining a discrete orientation in which the support arm may be set by receiving the protrusion on the support arm.

13. Wheel axle suspension according to claim 9, wherein a countersurface is provided on the clamping part.

14. The method for mounting the wheel axle suspension according to claim 13, wherein the clamping part is provided with a recess and wherein the end portion of the pneumatic spring support arm opposite the end portion where the pneumatic spring is attached, is provided with at least one protrusion that is receivable within said recess.

15. The method for mounting the wheel axle suspension according to claim 14, wherein the recess in the clamping part is a guiding groove, the protrusion on the support arm is received within the guiding groove, and wherein the guiding groove preferably has end stops determining the extreme orientations in which the pneumatic spring support arm is mountable.

16. The method for mounting the wheel axle suspension according to claim 14, wherein a plurality of recesses are provided in the clamping part, each recess defining a discrete orientation in which the support arm may be set by receiving the protrusion on the support arm.

17. Wheel axle suspension according to claim 1, wherein the pneumatic spring is attached to the pneumatic spring support arm such that the centre axis of the pneumatic spring and the centre axis of the support arm intersect each other or nearly intersect each other.

18. Wheel axle suspension according to claim 1, wherein the axle body in the fitted position bears directly to a contact region of the trailing arm, which contact region essentialy is complementary to the outer contour of the axle body.

19. Wheel axle suspension according to claim 18, wherein the trailing arm is clamped against the axle body by means of clamping means.

20. Wheel axle suspension according to claim 18, wherein the trailing arm, at the rear of the contact region, is provided with a single hole through which a clamping means extends.

21. Wheel axle suspension according to claim 20, wherein the clamping means extending through the rear hole in the contact region is a clamping bolt which also forms the swiveling point for the pneumatic spring support arm.

22. Wheel axle suspension according to claim 18, wherein the portion of the trailing arm which forms the contact region, in top view, has an approximately triangular shape, the greatest width of which is situated at the front of said portion and the tip of the triangle being situated at the rear of that portion.

23. Wheel axle suspension according to claim 22, wherein two holes are provided near the wide front of that portion of the trailing arm which forms the contact region, and a single hole is provided at the narrower rear of said portion.

24. Wheel axle suspension according to claim 1, wherein the pneumatic spring support arm is attached to the trailing arm.

25. Vehicle provided with a wheel axle suspension according to claim 1.

26. Method for mounting a wheel axle suspension under a vehicle, the method including the following steps:
arranging a bearing bracket to a vehicle chassis;
hingedly connecting a trailing arm at the front in the direction of travel of the vehicle to a bearing bracket, such that said trailing arm extends in the longitudinal direction of the vehicle;
attaching an axle body to the trailing arm;
coupling a pneumatic spring support arm to the axle body; and
arranging a pneumatic spring between the chassis and the pneumatic spring support arm,
wherein the pneumatic spring support arm is coupled to the axle body in such a way that the pneumatic spring support arm is mountable in a plurality of orientations with respect to the longitudinal direction of the vehicle,
wherein the pneumatic spring support arm during mounting is rotated around a swiveling axis defined by a pin member which extends through an aperture provided on or in the pneumatic spring support arm to adjust its orientation and then is secured such that it is fixed in a selected orientation.

* * * * *